United States Patent [19]

McFarland et al.

[11] Patent Number: 5,674,663

[45] Date of Patent: Oct. 7, 1997

[54] METHOD OF APPLYING A PHOTOSENSITIVE RESIN TO A SUBSTRATE FOR USE IN PAPERMAKING

[76] Inventors: James Robert McFarland; Paul Dennis Trokhan; John Robert Powers; James Daniel Miller, II; Glenn David Boutilier, all of The Procter & Gamble Company, 6100 Center Hill Ave., Cincinnati, Ohio 45224

[21] Appl. No.: 736,875

[22] Filed: Oct. 25, 1996

Related U.S. Application Data

[63] Continuation of Ser. No. 388,948, Feb. 15, 1995, abandoned.
[51] Int. Cl.⁶ .................................................. G03F 7/30
[52] U.S. Cl. ....................... 430/320; 430/327; 430/325; 430/324; 162/900; 162/358.2; 427/510; 427/513
[58] Field of Search ................................... 430/320, 327, 430/325, 324; 162/900, 358.2; 427/510, 513

[56] References Cited

U.S. PATENT DOCUMENTS

| Re. 32,713 | 7/1988 | Woo | 428/240 |
|---|---|---|---|
| 3,549,742 | 12/1970 | Benz | 264/250 |
| 3,836,367 | 9/1974 | Klemm | 430/308 |
| 4,250,172 | 2/1981 | Mutzenberg et al. | 428/234 |
| 4,390,574 | 6/1983 | Wood | 428/36 |
| 4,446,187 | 5/1984 | Eklund | 428/136 |
| 4,464,432 | 8/1984 | Dost et al. | 428/280 |
| 4,514,345 | 4/1985 | Johnson et al. | 264/22 |
| 4,637,859 | 1/1987 | Trokhan | 162/109 |
| 4,795,480 | 1/1989 | Boyer et al. | 51/296 |
| 5,098,522 | 3/1992 | Smurkoski et al. | 162/358 |
| 5,217,799 | 6/1993 | Sumi et al. | 428/280 |
| 5,236,778 | 8/1993 | Landis et al. | 428/282 |
| 5,275,700 | 1/1994 | Trokhan | 430/320 X |
| 5,334,289 | 8/1994 | Trokhan et al. | 162/358.2 |
| 5,346,567 | 9/1994 | Barnewall | 156/78 |

FOREIGN PATENT DOCUMENTS

| 0 196 045 A2 | 10/1986 | European Pat. Off. . |
|---|---|---|
| 0 647 737 A1 | 4/1995 | European Pat. Off. . |
| 3043918 A1 | 6/1981 | Germany . |
| 2 142 556 A | 1/1985 | United Kingdom . |
| WO91/14558 | 10/1991 | WIPO . |

OTHER PUBLICATIONS

P. 291 of Ullmann's Ency. of Ind. Chem., vol. 15 (1990).
Rahne, Maurice, New Curing Techniques in the Printing, Coating and Plastics Industries, Noyes Data Corporation, Park Ridge, New Jersey 1973, pp. 1–2.
Pappas, S. Peter, "Photopolymerization" from Encyclopedia of Polymer Science and Engineering, vol. 11, John Wiley & Sons, New York 1988, pp. 186–212.

Primary Examiner—Cynthia Hamilton
Attorney, Agent, or Firm—Gerry S. Gressel; Larry L. Huston; E. Kelly Linman

[57] ABSTRACT

The invention comprises a method for applying a curable resin, such as a photosensitive resin, to a substrate such as a papermaker's dewatering felt. The method comprises the steps of providing a substrate; providing a curable liquid resin; providing a second material different from the curable liquid resin; applying the second material to the substrate to occupy at least some of the voids in the substrate intermediate the first and second surfaces of the substrate; applying the curable resin to the substrate; curing at least some of the resin to provide a resin layer on the substrate; and removing at least some of the second material from the substrate, wherein at least some of the second material is removed from the substrate after applying the curable resin to the substrate.

25 Claims, 5 Drawing Sheets

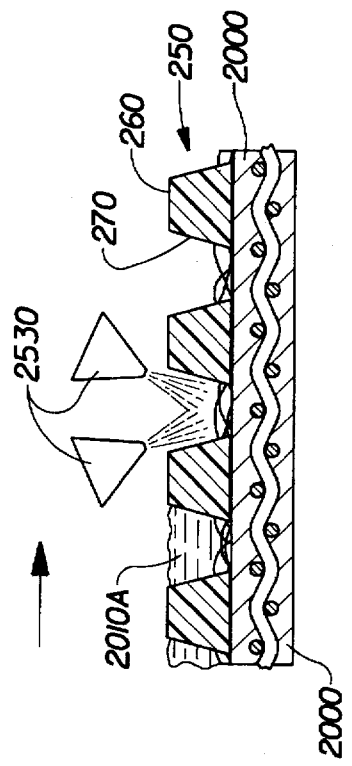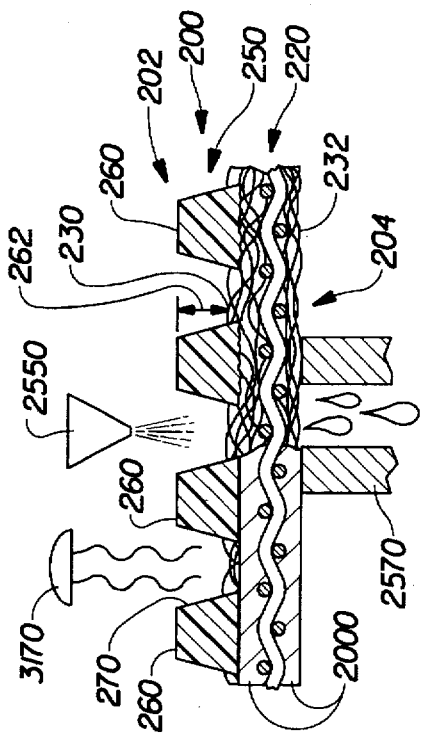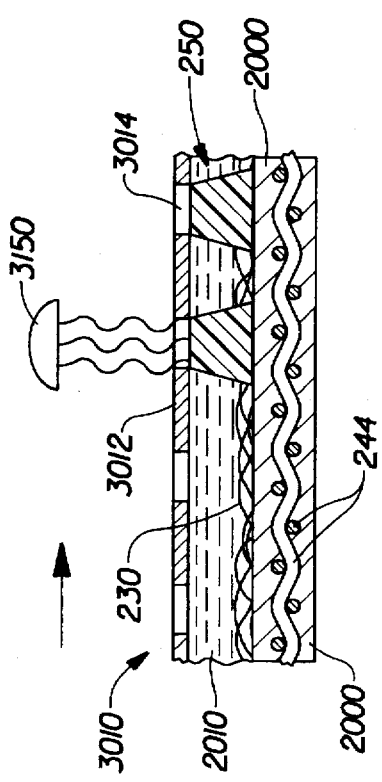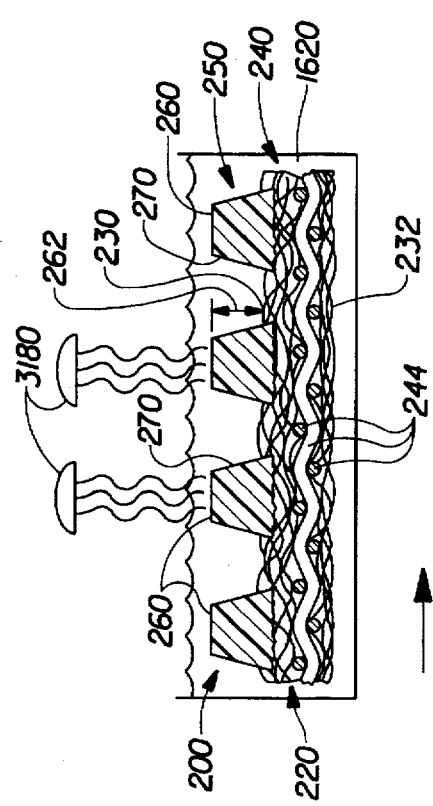
Fig. 4E
Fig. 4F
Fig. 4G
Fig. 4H

METHOD OF APPLYING A PHOTOSENSITIVE RESIN TO A SUBSTRATE FOR USE IN PAPERMAKING

This is a continuation of application Ser. No. 08/388,948, filed on Feb. 15, 1995, now abandoned.

FIELD OF THE INVENTION

The present invention provides a method for applying a curable resin to a substrate, and more particularly, to a method of applying a photosensitive resin to a substrate to form a web patterning apparatus for use in papermaking.

BACKGROUND OF THE INVENTION

The application of coatings, such as resin coatings and foam coatings to substrates is known in the papermaking art. For instance, it is known to apply a photosensitive resin to a foraminous member in a preselected pattern for use in a papermaking operation. It is also known to provide papermaking press fabrics with a coating, such as a foam coating, to achieve a controlled void volume and permeability. The following documents describe the use of resins, fillers, foams, layered constructions, or other coatings in making papermaking equipment: U.S. Pat. No. 3,549,742 issued Dec. 22, 1970 to Benz; U.S. Pat. No. 4,446,187 to Eklund; U.S. Pat. No. 4,514,345 issued Apr. 30, 1985 to Johnson et al.; U.S. Pat. No. 4,637,859 issued Jan. 20, 1987 to Trokhan; U.S. Pat. No. 4,795,480 issued Jan. 3, 1989 to Boyer et al.; U.S. Pat. No. 5,098,522 issued Mar. 24, 1992 to Smurkoski et al.; U.S. Pat. No. 5,346,567 issued Sep. 13, 1994 to Barnewall; U.S. Pat. No. 5,334,289 issued Aug. 2, 1994 to Trokhan et al.; and PCT Publication Number WO 91/14558 published Oct. 3, 1991 in the name of Sayers et al. and assigned to the SCAPA Group.

It is also known to impregnate textile fabrics, such as needled fiber mats and felt material, with resins and filler materials. The following documents describe the use of resins and/or fillers in fabrics: U.S. Pat. No. 4,250,172 to Mutzenberg et al; U.S. Pat. No. 4,390,574 to Wood; U.S. Pat. No. 4,464,432 to Dost et al.; U.S. Pat. No. 5,217,799 to Sumii et al.; U.S. Pat. No. 5,236,778 to Landis et al.; and Reissue Pat. No. 32,713 reissued Jul. 12, 1988 to Woo.

After curing a portion of the resin on a substrate to form a papermaking apparatus, it is desirable to remove uncured resin from the substrate. Removal of uncured resin from the substrate is important so that the resulting papermaking apparatus has the desired characteristics for its particular papermaking application. Such characteristics can include, but are not limited to, flexibility of the apparatus, compressibility of the apparatus, air permeability through the apparatus, and water permeability through the apparatus. Removal of uncured resin is especially important in a papermaking apparatus having a patterned resin surface with openings through which air and/or water is conveyed during formation or drying of the paper web. Uncured resin remaining in the substrate can reduce the permeability of the substrate, and thereby reduce flow through the openings in the patterned resin surface.

One method for removing uncured resin includes washing uncured resin from the substrate. For instance, above referenced U.S. Pat. No. 4,514,345 discloses washing uncured resin from a foraminous member formed of woven filaments, followed by vacuuming of residual wash liquid and uncured liquid from the foraminous member. However, washing and vacuuming, alone, can be ineffective in removing all uncured resin.

A felt or open celled foam substrate can have a large number of relatively small, internal void cavities which can trap uncured resin. Such trapped uncured resin can degrade the performance of the papermaking apparatus, as described above. In addition, such trapped resin is essentially wasted, adding to the cost of the resin casting process. Removal of the trapped resin by increasing the number of washing and vacuum cycles also increases the cost of the process.

Moreover, in some applications it may be desirable to control the depth of penetration of the resin into the substrate. For instance, it may be desirable to have the cured resin layer penetrate a predetermined portion of the thickness of the substrate, so as to provide acceptable bonding of the resin to the substrate, while maintaining the flexibility of the substrate and the permeability of the substrate to air and water.

U.S. Pat. No. 3,549,742 issued Dec. 22, 1970 to Benz discloses inserting filling material into apertures in a drainage member which will ultimately be open for drainage, after which a settable material is inserted into the remaining apertures of the drainage member in the predetermined areas in which flow of liquid through the drainage member is to be prevented. The settable material is fixed or cured, after which the filling material is removed from the drainage member. Benz has the disadvantage that the filler material is arranged in a predetermined pattern prior to application to the drainage member, and the filler material must be pressed into the drainage member such that predetermined areas of the drainage member member are left free of the filling material. Accordingly, the pattern in which the settable material can be fixed to the drainage member is limited by the predetermined areas of the drainage member left free of the filling material.

Also, Benz uses pressure to mechanically force the filler material into the drainage member. Pressing a filling material into a substrate can suffer from the disadvantage that, if the substrate has many small internal voids, and is relatively compressible, applying pressure to the substrate can collapse the substrate or close some of the voids in the substrate, thereby making penetration of the substrate by the filler material difficult.

In addition, pressing a filling material into a felt layer can result in the filling material flowing laterally into areas of the felt which are meant to be left open for the settable material. Therefore, the method disclosed by Benz is undesirable for use in applying a curable resin to a felt layer.

Accordingly, one object of the present invention is to provide a method of applying a curable resin to a substrate to form a papermaking apparatus.

Another object of the invention is to provide a method for reducing the amount of uncured photosensitive resin that is required to be removed from a paper web patterning apparatus suitable for making paper having visually discernible patterns.

Another object is to provide a method for forming a web patterning apparatus having a dewatering felt layer and a patterned photosensitive resin layer which penetrates a surface of the felt layer and extends from the surface of the felt layer.

SUMMARY OF THE INVENTION

The invention comprises a method of applying a curable resin to a substrate. In particular, the method can be used to form a papermaking apparatus such as a paper web forming fabric or a paper web drying fabric. In one embodiment, the method of the present invention can be used to apply a photosensitive resin to a dewatering felt layer to provide a papermaking apparatus that can be used to pattern and dewater a paper web. The resulting papermaking apparatus can comprise a dewatering felt layer having a first web facing felt surface at a first elevation and a second oppositely facing felt surface, and a web patterning layer comprising the photosensitive resin. The patterning layer penetrates the first felt surface, and extends from the first felt surface to form a web contacting top surface at a second elevation different from the elevation of the first felt surface.

The method according to the present invention provides a barrier in the substrate to restrict the depth to which the curable liquid resin can penetrate through the thickness of the substrate. The method comprises the steps of:

providing a substrate having a first surface, a second surface, and a thickness, the substrate having voids intermediate the first and second surfaces;

providing a curable liquid resin;

providing a second material different from the curable liquid resin;

applying the second material to the substrate to occupy at least some of the voids in the substrate intermediate the first and second surfaces of the substrate;

applying the curable resin to the substrate;

curing at least some of the resin to provide a resin layer on the substrate; and removing at least some of the second material from the substrate, wherein at least some of the second material is removed from the substrate after applying the curable resin to the substrate.

The step of removing at least some of the second material preferably comprises removing at least about 50 percent of the second material applied to the substrate, and more preferably, removing substantially all of the second material applied to the substrate.

In one embodiment the substrate comprises a papermaker's dewatering felt, and the resin comprises a photosensitive resin.

In one embodiment, the method includes the steps of reducing the mobility of the second material applied to the substrate prior to applying the resin to the substrate. The method can also include the step of increasing the mobility of the second material after curing at least some of the resin, to thereby facilitate removal of the second material from the substrate.

In one embodiment, the method can include the step of changing the phase of the second material applied to the substrate prior to applying the liquid photosensitive resin. In one embodiment the second material is applied throughout the thickness of the substrate as a liquid mixture of water and a soap gelling agent. The second material is cooled to harden the second material to a gel phase. A thin layer of the gelled second material adjacent to the first surface of the substrate is liquified or solubilized for removal by water showering to provide a portion of the thickness of the substrate adjacent to the first surface which is substantially free of the second material.

The liquid photosensitive resin can then be applied to the first surface of the substrate to penetrate into the substrate from the first surface, and to extend outward of the substrate a predetermined distance from the first surface. A source of actinic radiation and a mask having opaque and transparent regions are provided. The liquid photosensitive resin is cured in a predetermined pattern by exposing the resin to the actinic radiation through the mask. Uncured liquid resin can then be washed from the first surface of the substrate with water showering. The gelled second material remaining in the substrate is then liquified and removed from the substrate by heating, hot water showering and vacuuming.

DESCRIPTION OF THE DRAWINGS

While the Specification concludes with claims particularly pointing out and distinctly claiming the present invention, the invention will be better understood from the following description taken in conjunction with the associated drawings, in which like elements are designated by the same reference numeral, and:

FIGS. 4A-4H are schematic illustrations of steps for making a web patterning apparatus according to the method of the present invention.

DETAILED DESCRIPTION OF THE INVENTION

Figure 1:
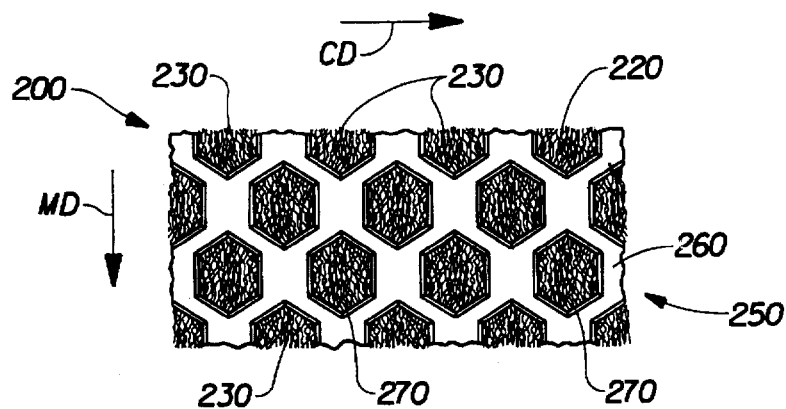
FIG. 1 is a plan view illustration of an apparatus made according to the method of the present invention, the apparatus including a dewatering felt layer and a cured photosensitive resin web patterning layer joined to the dewatering felt layer and having a continuous network web contacting top surface.
Figure 2:
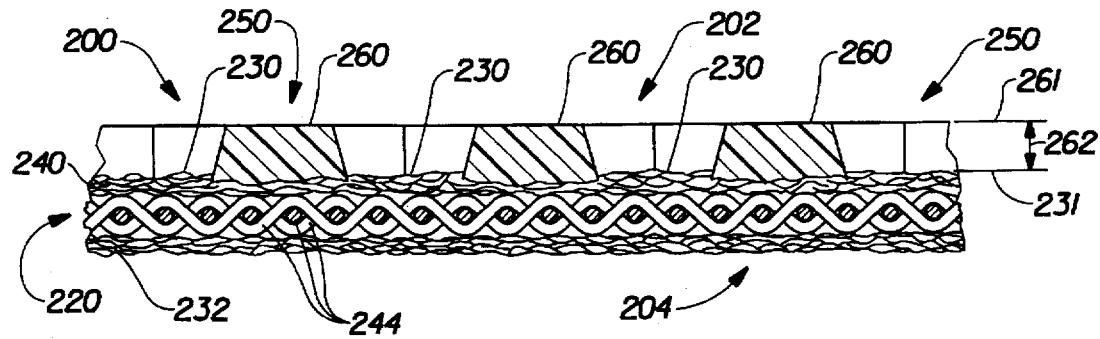
FIG. 2 is a cross-sectional illustration of the apparatus in FIG. 1.
Figure 3:
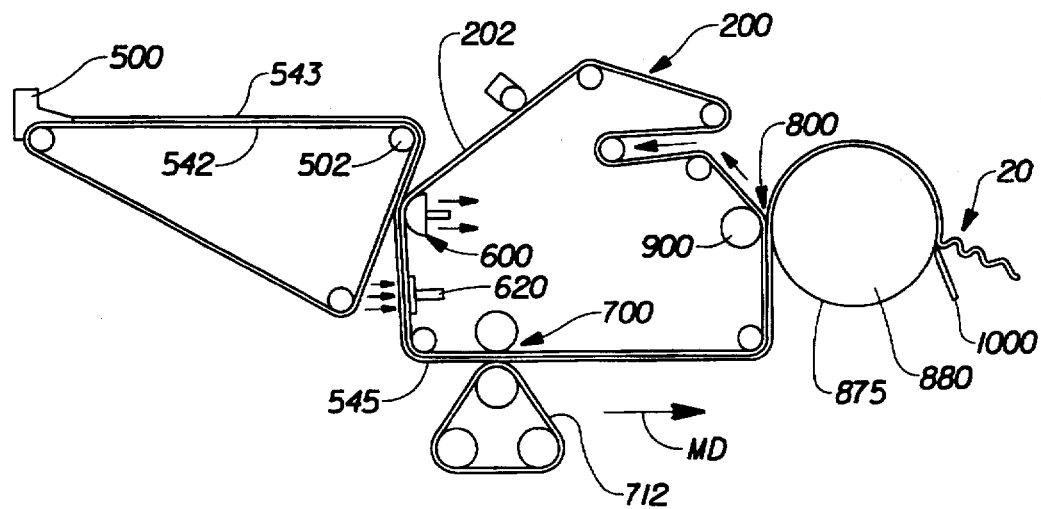
FIG. 3 is an illustration of a process for making paper with a web patterning apparatus made according to the method of the present invention.
Figure 4B:
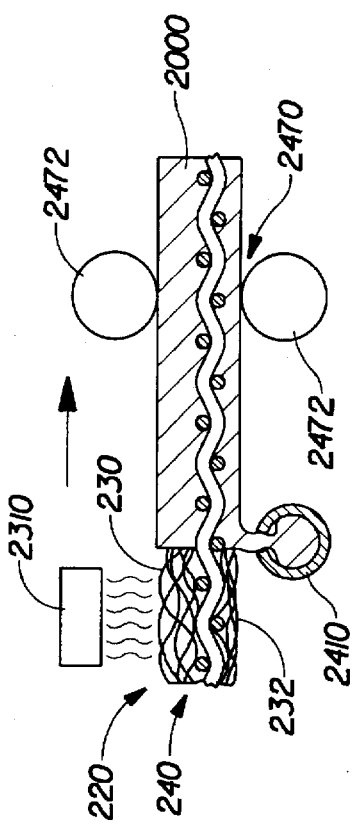
Figure 4C:
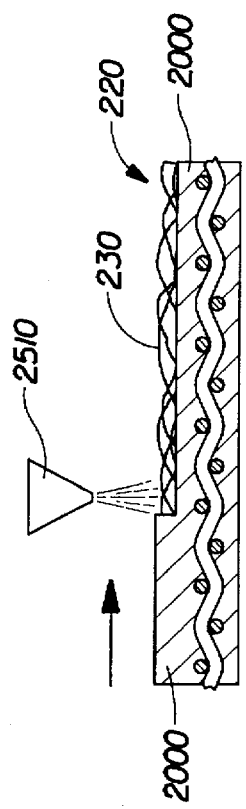
Figure 5:
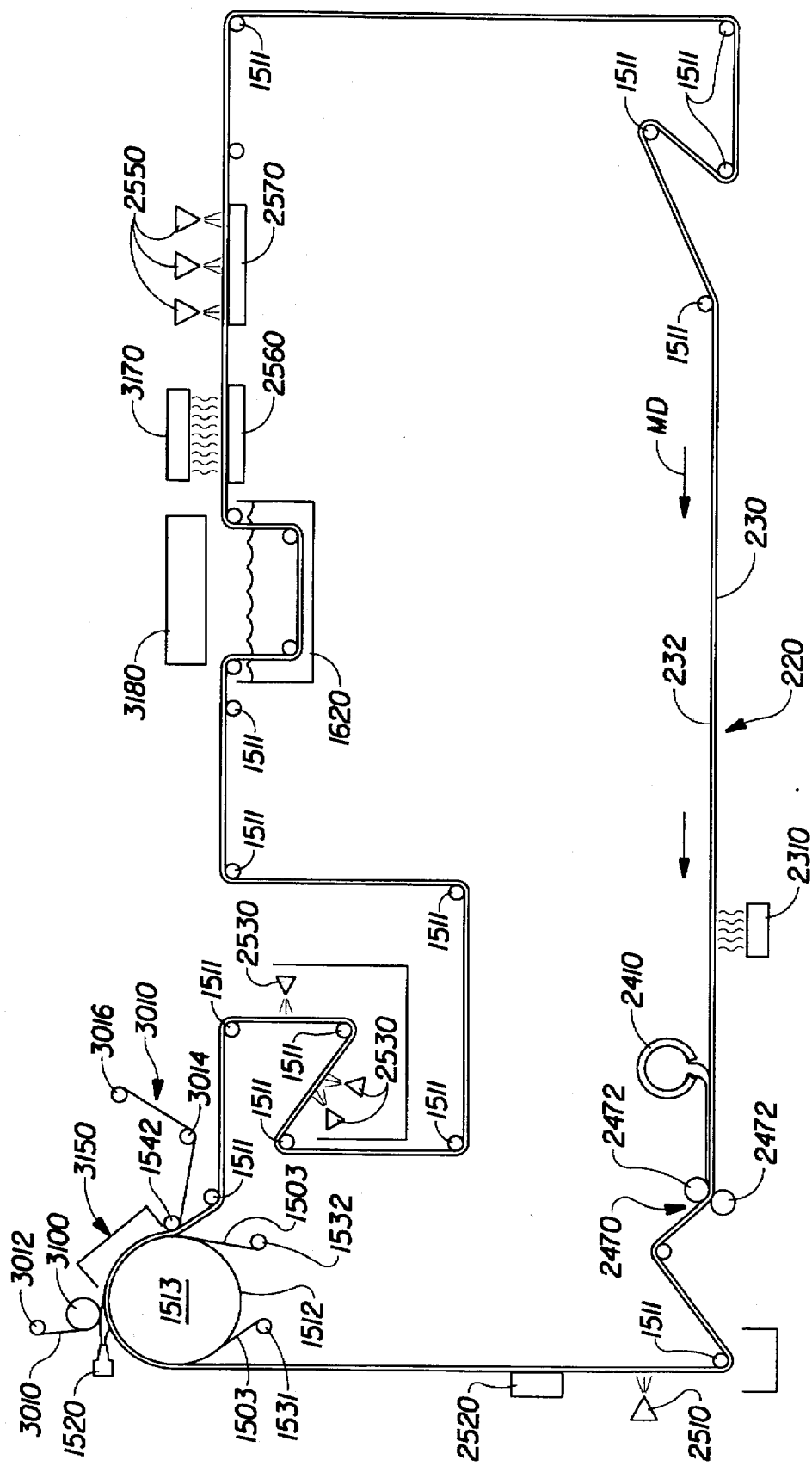
FIG. 5 is a schematic illustration of a method according to the present invention for making a web patterning apparatus having a felt dewatering layer and a web patterning layer formed from photosensitive resin.
Figure 6:
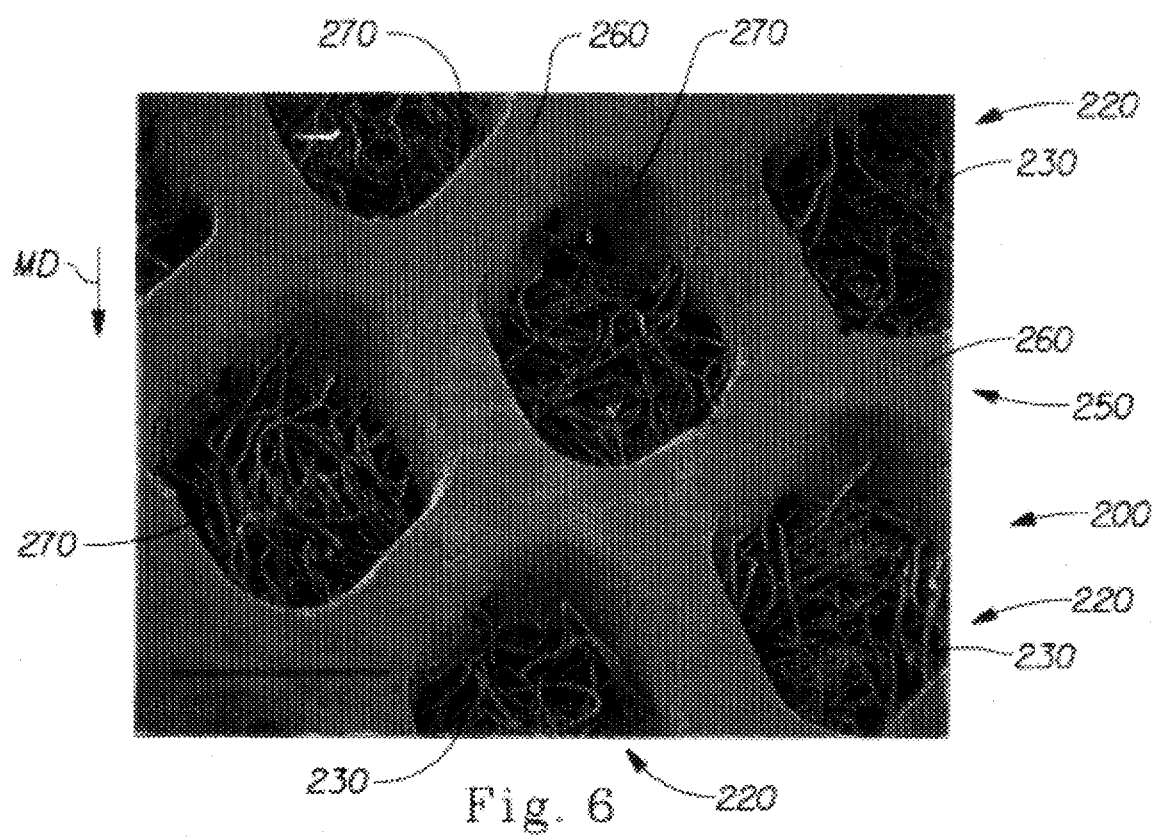
FIG. 6 is a photomicrograph of an apparatus made according to the method of the present invention.
Figure 7:
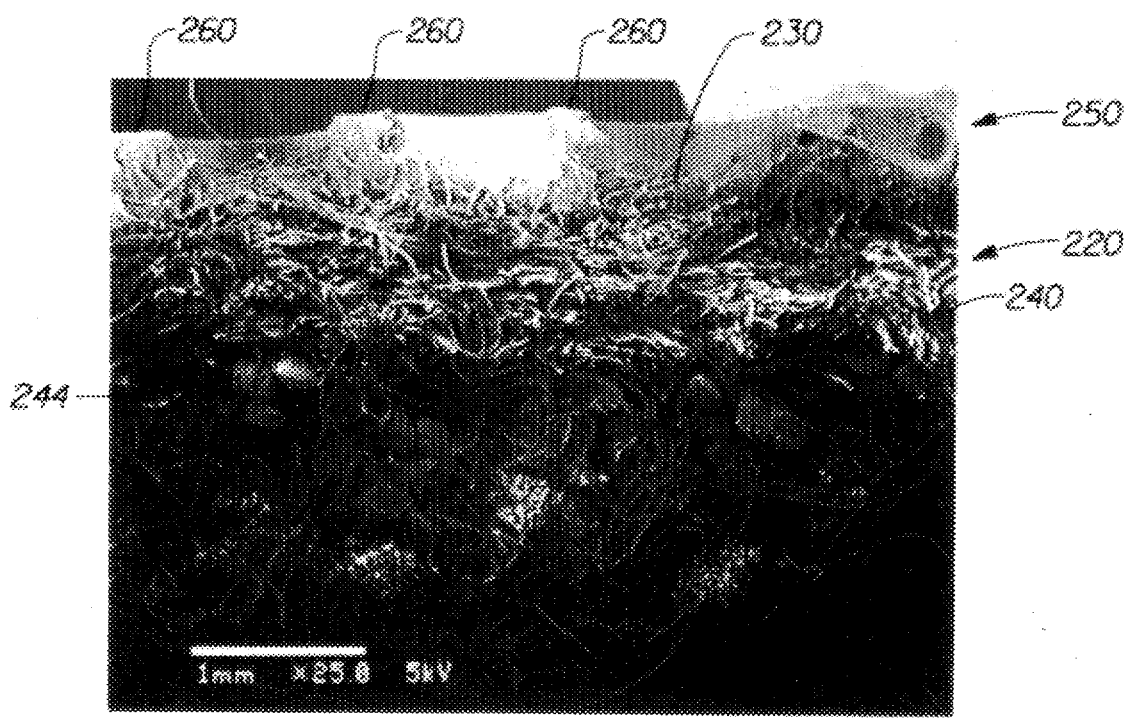
FIG. 7 is a photomicrograph of a cross-section of the apparatus of FIG. 6.

FIGS. 1 and 2 are illustrations of a papermaking web support apparatus 200 which can be made using the method of the present invention. The apparatus 200 can comprise a substrate, such as a dewatering felt layer 220, and a cured resin web patterning layer 250 joined to a surface of the felt layer 220. FIG. 3 illustrates a process for making a paper web using the apparatus 200 shown in FIGS. 1 and 2. FIGS. 4A-4H illustrate steps according to the present invention for making a web patterning apparatus 200 by curing a photosensitive resin on a surface of a substrate. FIG. 5 is a schematic illustration of one embodiment of the method of the present invention. FIGS. 6 and 7 are photomicrographs of an apparatus 200 made using the method of the present invention.

The Web Support Apparatus

FIGS. 1, 2, and 4H show a web support apparatus 200, which can comprise a continuous drying belt for drying and imparting a pattern to a paper web. The web support apparatus 200 has a first web facing side 202 and a second oppositely facing side 204. The web support apparatus 200 is viewed with the first web facing side 202 toward the viewer in FIG. 1.

The web support apparatus 200 includes a substrate having voids intermediate first and second surfaces of the substrate. At least some of the voids are preferably in flow communication with at least one of the surfaces of the substrate. For instance, the substrate can comprise a dewatering felt layer 220 having a first web facing felt surface 230 disposed at a first elevation 231 (FIG. 2), and an oppositely facing second felt surface 232. The felt layer 220 has a plurality of voids intermediate the first surface 230 and the second surface 232. The web support apparatus 200 also comprises a web patterning layer 250 joined to the first web facing surface 230. The web patterning layer 250 extends from the first felt surface 230, as shown in FIG. 2, to have a web contacting top surface 260 at a second elevation 261 different from the first elevation 231. The difference 262 (FIG. 4H) between the first elevation 231 and the second elevation 261 can be at least about 0.05 millimeter, and in one embodiment is between about 0.1 and about 2.0 millimeters.

The dewatering felt layer 220 is water permeable and is capable of receiving and containing water pressed from a wet web of papermaking fibers. The web patterning layer 250 is water impervious, and does not receive or contain water pressed from a web of papermaking fibers. The web patterning layer 250 can have a plurality of discrete openings 270 therethrough, and form a continuous network on the first felt surface 230, as shown in FIG. 1. Alternatively, the web patterning layer can be discontinuous, or semicontinuous.

The web patterning layer 250 comprises a curable resin which can be deposited on a surface of a substrate as a liquid, and subsequently cured so that a portion of the web patterning layer penetrates a surface of the substrate. In particular, the web patterning layer 250 can comprise a photosensitive resin which can be deposited on the first surface 230 as a liquid and subsequently cured by radiation so that a portion of the web patterning layer 250 penetrates, and is thereby securely bonded to, the first felt surface 230. The web patterning layer 250 preferably does not extend through the entire thickness of the felt layer 220, but instead extends through less than about half the thickness of the felt layer 220 to maintain the flexibility and compressibility of the web support apparatus 200, and particularly the flexibility and compressibility of the felt layer 220.

Figure 4A:
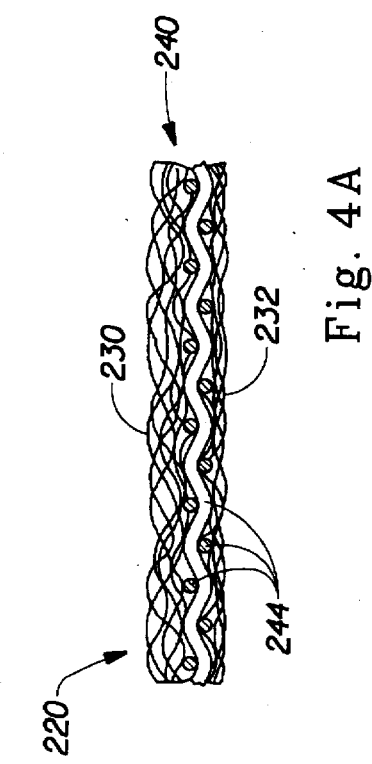

A suitable dewatering felt layer 220 comprises a batt 240 of natural or synthetic fibers joined, such as by needling, to a support structure formed of woven filaments 244, as shown in FIG. 4A. Suitable materials from which the batt 240 is formed include but are not limited to natural fibers such as wool and synthetic fibers such as polyester and nylon. The fibers from which the batt 240 is formed can have a denier of between about 1 and 20 grams per 9000 meters of filament length.

The felt layer 220 can have a layered construction, and can comprise a mixture of fiber types and sizes. The felt layer 220 can have finer, relatively densely packed fibers disposed adjacent the first felt surface 230. In one embodiment, the felt layer 220 can have a relatively high density and relatively small pore size adjacent the first felt surface 230 as compared to the density and pore size of the felt layer 220 adjacent the second felt surface 232.

The dewatering felt layer 220 can have a thickness of between about 2 millimeters and about 5 millimeters, a basis weight of between about 800 and about 2000 grams per square meter, an average density (basis weight divided by thickness) of between about 0.16 gram per cubic centimeter and about 1.0 gram per cubic centimeter, and an air permeability of between about 5 and about 300 standard cubic feet per minute (scfm), where the air permeability in scfm is a measure of the number of cubic feet of air per minute that pass through a one square foot area of the felt layer 220 at a pressure drop across the thickness of the felt layer 220 equal to about 0.5 inch of water. The air permeability is measured using a Valmet permeability measuring device (Model Wigo Taifun Type 1000) available from the Valmet Corp. of Pansio, Finland. The permeability of the web support apparatus 200 is less than or equal to the permeability of the felt layer 220 and is about equal to the permeability of the felt layer 220 multiplied by the fraction of the projected area of the apparatus 200 not covered by the web patterning layer 250.

A suitable felt layer 220 is an Amflex 2 Press Felt manufactured by the Appleton Mills Company of Appleton, Wis. Such a felt layer 220 can have a thickness of about 3 millimeter, a basis weight of about 1400 gm/square meter, an air permeability of about 20 to 30 scfm, and have a double layer support structure having a 3 ply multifilament top and bottom warp and a 4 ply cabled monofilament cross-machine direction weave. The batt 240 can comprise nylon fibers having a denier of about 3 at the first surface 230, and denier of between about 10–15 in the batt substrate underlying the first surface 230.

Suitable photosensitive resins are disclosed in U.S. Pat. No. 4,514,345 issued Apr. 30 1985 to Johnson et al. and U.S. Pat. No. 5,334,289 issued Aug. 2, 1994 to Trokhan et al., which patents are incorporated herein by reference. The resin, when cured, can have a hardness of less than or equal to about 60 Shore D. The hardness is the average of five measurements on an unpatterned photopolymer resin coupon measuring about 1 inch by 2 inches by 0.025 inches thick cured under the same conditions as the web patterning layer 250. The hardness measurements are made at 25 degrees Centigrade and read 10 seconds after initial engagement of the Shore D durometer probe with the resin. A resin having such a hardness upon curing is desirable so that the web patterning layer 250 is somewhat flexible and deformable. The cured resin preferably resists oxidation. The uncured resin can have viscosity of between about 5000 and about 25000 centipoise at 70 degrees Fahrenheit to facilitate penetration of felt layer 220 by the resin prior to curing. Suitable liquid photosensitive resins included in the Merigraph series of resins made by Hercules, Inc. of Wilmington, Del. incorporating an antioxidant as disclosed in above referenced U.S. Pat. No. 5,334,289. A suitable liquid photosensitive resin is a MEH-1000 resin available from Hercules, Inc.

Use of the Web Support Apparatus to Make Paper

FIG. 3 illustrates use of the apparatus 200 in making a paper web 20. A slurry of papermaking fibers, such as cellulosic wood pulp fibers, is deposited from a headbox 500 onto a foraminous, liquid pervious forming belt 542, to form an embryonic web of papermaking fibers 543 supported by the forming belt 542. The forming belt 542 can comprise a continuous Fourdrinier wire, or alternatively, can be in the form of any of the various twin wire formers known in the art. The web 543 is then transferred from the forming belt 542 to the web support apparatus 200, with the embryonic web 543 positioned on the first side 202 of the web support apparatus 200.

The step of transferring the embryonic web 543 to the web support apparatus 200 can simultaneously include the step of deflecting a portion of the web 543 into openings 270 in the web patterning layer 250 to form a non-monoplanar web 545. The steps of transferring the embryonic web 543 to the web support apparatus 200 and deflecting a portion of the embryonic web 543 can be provided, at least in part, by applying a differential fluid pressure to the embryonic web 543 by a vacuum source 600. One or more additional vacuum sources 620 can also be provided downstream of the embryonic web transfer point.

After transferring and deflecting the embryonic web 543 to form the non-monoplanar web 545, the web 545 is carried on the web support apparatus 200 through a nip 800 provided between a yankee drying drum 880 and a roller 900. The web is transferred to and dried on the surface 875 of the drum 880, and then creped from the surface 875 by a doctor blade 1000 to form a creped paper web 20. Prior to transferring the web 545 to the drying drum 880, the web can be further dewatered, such as by pressing or by through air drying. For instance, the web can be pressed in a press nip 700 between the web support apparatus 200 and a separate dewatering felt 712, as is disclosed in U.S. patent application Ser. No. 08/358,661 "Wet Pressed Paper Web and Method of Making the Same" filed Dec. 19, 1994 in the name of Ampulski et at. The following patent documents are incorporated herein by reference in their entirety for the purpose of disclosing how to make a patterned web 20: U.S. Pat. No. 4,529,480 issued Jul. 16, 1985 to Trokhan; U.S. patent application Ser. No. 08/268,154 "Web Patterning Apparatus Comprising a Felt Layer and a Photosensitive Resin Layer" filed Jun. 29, 1994 in the Name of Trokhan et al.; U.S. patent application Ser. No. 08/268,213 "Paper Structures Having at Least Three Regions Including a Transistion Region Interconnecting Relatively Thinner Regions disposed at Different Elevations, and Apparatus and Process for Making the Same" filed Jun. 29, 1994 in the name of Trokhan et al.; and U.S. patent application Ser. No. 08/358,661 "Wet Pressed Paper Web and Method of Making the Same" filed Dec. 19, 1994 in the name of Ampulski et at.

Making a Paper Web Support Apparatus with Photosensitive Resin Cured on a Felt Layer The web support apparatus 200 can be made according to the present invention using steps illustrated in FIGS. 4A–4H. A substrate is provided having a first surface, a second surface, and a thickness, with the substrate having voids intermediate the first and second surfaces. In FIG. 4A the substrate provided is a dewatering felt layer 220. A liquid photosensitive resin and a second material different from the photosensitive resin are also provided.

Referring to FIG. 4B, the present invention includes the step of applying the second material, designated by numeral 2000, to the felt layer 220. The felt layer 220 is conveyed in the direction shown by the arrow in FIG. 4B. In one embodiment, the felt layer 220 can be conveyed adjacent an infrared heating lamp 2310 positioned adjacent the first felt surface 230 of the felt layer 220 prior to applying the second material to the felt layer 220. The heating lamp 2310 can be used to warm the felt layer 220. Use of the heating lamp 2310 is optional, and not required.

The felt layer 220 can then be conveyed adjacent a header pipe 2410 positioned adjacent to the second surface 232 of the felt layer 220. The header pipe 2410 has an opening through which the second material 2000 is directed onto the second surface 232 of the felt layer 220. The second material is applied as a liquid to the felt layer 220 to occupy at least some voids in the felt layer intermediate the surfaces 230 and 232. In FIG. 4B, the second material is applied to the felt layer 200 to penetrate the entire thickness of the felt layer between the surfaces 230 and 232. The felt layer 220 on which the second material 2000 has been deposited is directed through a nip 2470 between rollers 2472 to ensure that the second material is distributed throughout the entire thickness of the felt layer 220 between the surfaces 230 and 232. Alternatively, the second material 2000 can be applied to the first surface 230 of the felt layer 220.

The second material 2000 fills voids in felt layer 220, and thereby provides a barrier to penetration of the liquid photosensitive resin throughout the felt layer 220. The second material 2000 serves to prevent the curable resin from entering certain target portions of the void-containing felt layer 220. The second material is preferably easily applied to the substrate, and is preferably not displaced from the felt layer 220 by the curable resin. The second material is also preferably easily removed from the felt layer 220 after curing of the resin applied to the felt layer 220.

In one embodiment, the second material 2000 (1) can be applied to the felt layer 220 in a relatively mobile state to provide penetration of the second material 2000 throughout the felt layer 220; (2) can be altered after it is applied to the felt layer and before application of the photosensitive resin to the felt layer 220 to have a reduced mobility to thereby resist displacement of the second material 2000 by the photosensitive resin; and (3) can be be altered to have an increased mobility after at least partially curing the resin to facilitate removal of the second material from the voids in the felt layer 220.

In one embodiment, the second material is relatively mobile when first applied to the substrate. For instance, the second material can comprise a liquid, a solute disolved in a liquid solvent, solid particles dispersed in a liquid component of the second material, or a mixture of liquid reaction components when first applied to the substrate. After the second material has been applied to the substrate, and prior to application of the curable resin to the substrate, the second material is altered to be relatively less mobile than when first applied to the substrate, so as to provide a barrier to penetration of the curable resin into predetermined portions of the substrate.

Prior to application of the curable resin to the substrate, the second material applied to the substrate is preferably transformable to be relatively immobile by, for example: increasing the viscosity of the second material; changing the phase of at least a portion of the second material from a liquid to a solid; evaporating a fluid component of the second material to provide an occlusive film or closed cell foam barrier in the substrate; or providing a chemical reaction that transforms liquid reaction components of the second material into highly viscous or solid reaction products. While FIGS. 4B through 4H will be discussed with reference to a second material which forms a gel, other examples of suitable second materials are provided below.

In one embodiment, the present invention includes the step of changing the phase of the second material 2000 applied to felt layer 220. The phrase "changing the phase of the second material" refers to a discontinuous change in certain properties of the second material at a definite temperature and pressure. Changing the phase of the second material includes changing a gas phase of the second material to a liquid or solid phase, changing a liquid phase of the second material to a gas phase or solid phase, and changing a solid phase of the second material to a gas or liquid phase. Examples of phase changes of the second material include, but are not limited to, liquifying the second material, subliming the second material, and solidifying the second material by freezing or gelling the second material. In one embodiment, the second material undergoes a phase change from a solid phase to a liquid phase at a temperature below the temperature at which the cured resin degrades (i.e. less than the melting temperature or the decomposition temperature of the cured resin), and more preferably at a temperature between about 50 degree Fahrenheit and about 150 degrees Fahrenheit.

Referring to FIG. 4B, in one embodiment the second material can be applied to the felt layer 220 as a liquid mixture of water and a gelling agent at an elevated temperature. The liquid mixture of water and the gelling agent can then be allowed to cool on the felt layer 220 to form a solid gel phase of the second material which fills voids in the felt layer 220.

Prior to applying the photosensitive resin to the felt layer 220, it can be desirable to remove some, but not all, of the second material from felt layer 220 before applying the photosensitive resin to felt layer 220. Referring to FIG. 4C, the present invention can include the step of removing second material from adjacent the first surface 230 of the felt layer 220, thereby providing a portion of the thickness of the felt layer 220 which is substantially free of the second material. Where the second material comprises a gel, a layer of the second material adjacent the first surface 230 of the felt layer 220 can be removed with a water shower 2510. Alternatively, layer of the second material can be removed from the felt layer 220 by mechanical brushing. Removing a layer of the second material adjacent the first surface 230 provides a predetermined portion of the thickness of the felt layer 220 to which the photosensitive resin can be applied and ultimately secured.

Figure 4D:
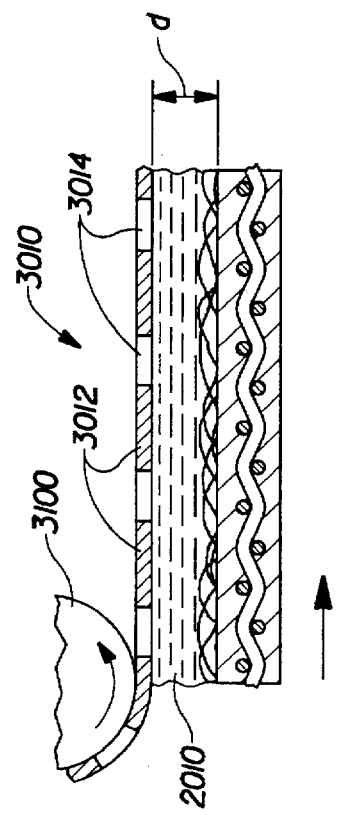

Referring to FIG. 4D, the present invention includes the step of applying the curable resin to the substrate. In the embodiment shown, a layer 2010 of the liquid photosensitive resin is applied to the exposed first surface 230 of the felt layer 220 after some second material is removed from the surface 230. A mask 3010 is positioned adjacent to the layer 2010 of liquid resin. The mask 3010 has opaque regions 3012 and transparent regions 3014. A nip roller 3100 controls the depth d of the layer 2010 deposited on the felt layer 220. The depth d is selected to be approximately equal to the desired difference in elevation 262 between the surface 260 of the cured resin layer 250 and the felt surface 230 (FIG. 4G) plus the thickness of the layer of second material 2000 removed from the felt layer in FIG. 4C.

Referring to FIG. 4E, the present invention includes the step of curing at least some of the resin applied to the substrate. In one embodiment of the present invention, the resin is selectively cured to provide a patterned resin layer on the substrate. In FIG. 4E, resin curing lamps 3150 provide a source of actinic radiation in a first curing step for at least partially curing the layer 2010 of liquid photosensitive resin deposited on the felt layer 220. The mask 3010 is positioned intermediate the lamps 3150 and the layer 2010 of liquid photosensitive resin. The liquid photosensitive resin is selectively exposed to the actinic radiation through the mask 3010 to induce curing of the photosensitive resin in registration with the transparent regions 3014 in the mask 3010. The first curing step provides a patterned resin layer 250 which is at least partially cured on the first surface 230 of the felt layer 220.

Referring to FIG. 4F, the present invention can include the step of removing uncured resin from the substrate after the first curing step shown in FIG. 4E. In FIG. 4F, uncured resin is indicated by reference numeral 2010A. The mask 3010 can be removed from the patterned resin layer 250. The uncured resin 2010A can then be removed with water showers 2530. The water showers can be angled to remove uncured resin 2010A from the openings 270 in the patterned resin layer 250. The solidified second material 2000 prevents the uncured resin from penetrating through the full thickness of the felt layer 220, and maintains the uncured resin adjacent the first surface 230 of the felt layer 220. Accordingly, the uncured resin 2010A is relatively easy to remove from the openings 270 in the resin layer 250 with a water shower 2530. Referring to FIG. 4G, the present invention includes the step of removing at least some of the second material 2000 from the substrate after the resin is applied to the substrate. In embodiments where the second material 2000 is solidified, such as by gelling, the second material 2000 can be removed by heating the second material to a temperature above its gelling temperature, thereby liquifying the gelled second material. In FIG. 4G, the felt layer 220 is conveyed adjacent an infrared heating lamp 3170 positioned adjacent the first surface 230 of the felt layer 220. The second material 2000 can be heated with infrared heating lamps 3170 to liquify the second material. The felt layer 220 can then be washed with a hot water shower 2550, and directed over a vacuum box 2570 to remove the liquified second material, as well as any remaining uncured photosensitive resin. In FIG. 4G, the hot water shower 2550 directs a spray against the first surface 230 of the felt layer 220. The vacuum box 2570 provides a vacuum at the second surface 232 of the felt layer 220 to remove liquified second material from the second surface 232. Showering and vacuuming can be repeated, as necessary, to remove the liquified second material from the felt layer 220.

Preferably, at least 50 percent of the second material 2000 applied to the substrate is removed, and most preferably substantially all of the second material 2000 applied to the substrate is removed from the substrate. As shown in FIGS. 4C and 4G, the second material can be removed from the substrate both before and after the liquid resin is applied to the substrate. In the embodiment shown, more of the second material is removed after application of the liquid resin to the substrate than is removed before the resin is applied to the substrate.

In FIGS. 4F and 4G, the uncured liquid resin is washed prior to removal of the second material remaining on the felt layer 220. Alternatively, all the second material 220 can be removed from the felt layer 220, followed by washing of uncured liquid resin from the felt layer 220.

Referring to FIG. 4H, the method according to the present invention can include a post curing step performed after substantially all of the uncured liquid resin 2010A and substantially all of the second material 2000 has been removed from the felt layer 220. A source of actinic radiation, such as resin post curing lamps 3180 is positioned above the resin layer 250 to complete curing of the resin layer 250. Removal of all the second material and all the uncured liquid resin from the substrate prior to final curing of the resin layer 250 by lamps 3180 is desirable to prevent inadvertent curing of resin in portions of the felt layer 220 where permeability to air and water is desired. The post curing step can be performed with the resin layer 250 submerged in a water bath 1620 to promote complete reaction of the photosensitive resin, as described below.

The resulting web support apparatus 200 has a cured resin layer 250 which penetrates the first surface 230 of the felt layer 220 to extend intermediate the first and second surfaces 230 and 232. The cured resin layer 250 also extends from the first surface 230 to have a web contacting top surface 260 at a second elevation different from the elevation of the first surface 230.

Examples of Second Materials for Filing Voids in the Substrate

A number of materials are suitable for use as second material 2000 for filing voids in the substrate to prevent penetration of the liquid resin throughout the thickness of the substrate. Preferably, the second material is added to the substrate prior to application of the liquid resin to the substrate. However, in alternative embodiments the second material could be applied to a substrate to displace liquid resin that has been previously applied to the substrate. The following examples are meant to be illustrative but not limiting.

In one embodiment the second material can comprises water. Where water is used as the second material 2000, it is preferred that distilled water is used to prevent hard water deposits on the substrate. For example, water can be added to the felt layer 220 as a liquid, and maintained as a liquid throughout the steps of adding and curing the liquid photosensitive. Maintaining the water as a liquid while adding the liquid curable resin to the substrate has the disadvantage that some, if not most of the water can be displaced by the liquid resin before the resin is cured.

In another embodiment, water can be added to the felt layer 220 as a liquid, and then frozen prior to addition of the liquid photosenstive resin. Changing the phase of the water by freezing the water can provide a layer of ice in the felt layer that prevents penetration of the liquid resin throughout the thickness of the felt layer 220.

In another embodiment, the second material can be transformed to have a substantially increased viscosity as compared to its viscosity when first applied to the felt layer 220. By substantially increase the viscosity of the second material, it is meant that the viscosity of the second material increases by a factor of at least 10, and preferably at least 100. For example, the second material can comprise a solvent and a solute, such as a mixture of water and a solute component which is soluble in water. The water soluble component can comprise a water soluble resin such a polyvinyl alcohol, applied to the felt layer at an elevated temperature and low solids content. By "soluble in water" it is meant that a component is soluble in deionized water at 25 degree Centigrade at a level of at least about 1.0 percent.

Specifically, the second material can include an 8 percent by weight solution of Elvanol HV (available from Dupont Company, Wilmington, Del.) in water. The second material can be applied to the substrate at a temperature of about 160 degrees Fahrenheit. Such a solution has a viscosity of about 250 centipoise and readily fills the voids in a felt layer 220. The concentration of the solution can be increased to about 14 percent by evaporating water, and the temperature of the solution can be decreased to about 70 degrees Fahrenheit to increase the viscosity of the second material to about 35,000 centipoise. After the photosensitive resin is applied and cured, the Elvanol can be resolubilized, preferably with hot water.

In another embodiment, the second material can comprise a water soluble gum dissolved in water. Preferred gums show pseudoplastic behavior (shear thinning). "Shear thinning" refers to the reduction of the viscosity of a material when the material is subjected to shear forces. In one embodiment, a 1-3 percent solution of a high viscosity guar gum in water is added to the void containing substrate while the gum and water solution is subjected to a shear rate and an elevated temperature. At a shear rate in excess of about 10 reciprocal minutes and a temperature of at least about 60 degrees Centigrade the viscosity of the gum and water solution is reduced sufficiently to allow easing filling of the felt layer 220 with the gum and water solution. The shear rate on the gum and water solution is then eliminated, and the solution allowed to cool to about 70 degrees Fahrenheit to provide the gum and water solution with a viscosity greater than or equal to about 50,000 centipoise. The increased viscosity of the gum and water solution prevents displacement of the gum and water solution from the felt layer 220 by the curable liquid resin. The "Handbook of Water Soluble Gums and Resins," edited by R. L. Davidson, McGraw-Hill, 1980, pp. 6-1 to 6-8 is incorporated herein by reference for the purpose of disclosing suitable water soluble gums and applying and measuring shear rates.

In another embodiment, the second material can comprise a mixture of water and a second component, wherein the water can be removed from the mixture, such as by drying or evaporation. For instance, the second material can be added to the felt layer 220, and the water can be removed from the second material, such as by evaporation, to provide a barrier to photosensitive resin penetration of the substrate. The barrier can then be removed from the substrate by showering the substrate with water to wash the barrier from the substrate. For instance, the second material can comprise a solution of water and a high molecular weight polyvinyl alcohol plasticized with glycerol. Such a solution can be liquid at about 70 degrees Fahrenheit, and transforms into a film as the water in the solution evaporates. Suitable polyvinyl alcohols include Elvanol 90-50 and Elavanol 71-30 (available from Dupont Company, Wilmington, Del.). A suitable aqueous solution comprises about 6–8 percent by weight polyvinyl alcohol. Prior to mixing the polyvinyl alcohol in water, the polyvinyl alcohol can be plasticized by forming a mixture of about 90 to 95 percent polyvinyl alcohol, and about about 5 to 10 percent by weight glycerol. The polyvinyl alcohol and glycerol mixture can then be added to water to form the aqueous solution comprising about 6–8 percent by weight polyvinyl alcohol.

In another embodiment, the second material can comprise a solid dispersed in a liquid. For instance, the second material can comprise a low glass transition temperature latex rubber dispersed in water. The dispersion can comprise about 40 percent by weight poly acrylate latex resin in water. The poly acrylate latex resin can comprise Roplex TR-520 poly acrylate latex resin available from the Rohm and Haas Company. Upon evaporation of the water in the dispersion, the solid latex spheres coalesce into a rubbery film that is easily redispersed with water provided the temperature of the film is kept below the cross-linking temperature of the latex rubber. Alternatively, a blowing agent which produces a gas upon heating can be added to the dispersion. For instance, diazocarbamide can be added to the latex resin and water dispersion to produce nitrogen on heating, thereby forming a latex foam upon evaporation of the water in the dispersion.

In one embodiment, the second material can comprise a water soluble wax like material, such as polyoxyethylene glycol (PEG). PEG can have a melting point below the degradation temperature of the curable photosensitive resin, such that the second material is a solid at or near about 70 degrees Fahrenheit, and can be liquified below the degradation temperature of the curable photosensitive resin. For instance, a PEG having a molecular weight in excess of about 600 is suitable. More specifically, the second material can comprise PEG 1500 with a melting point of about 46 degrees C., PEG 4000 with a melting point of about 56 degrees C., PEG 6000 with a melting point of about 60 degrees C., and mixtures thereof. Alternatively, the second material can comprise a relatively low molecular weight PEG, such as PEG 400, which can remain a liquid during application and curing of the photosensitive resin.

The second material 2000 can also comprise water soluble surfactants and water dispersible surfactant systems. For instance, the second material can comprise a liquid detergent solution, such as a detergent solution comprising anionic and nonionic surfactants, an ethyl alcohol dispensing agent, and water. The detergent solution can be applied to the substrate prior to application of the resin to the substrate. Such a detergent solution is commercially available as Joy Brand Diswashing Liquid from the Procter and Gamble Company of Cincinnati, Ohio.

The second material 2000 can also comprise a water soluble surfactant or water dispersible surfactant system that is a solid below about 70 degrees Fahrenheit. Examples of water soluble surfactants include anionic derivatives of sulfosuccinic acids. Applied as water solutions, these materials dry to flexible occlusive films suitable to provide a barrier to penetration of the substrate by the liquid photosensitive resin. An example of an anionic surfactant is Aerosl OT-75 (available from American Cyanimid.) Aerosol OT surfactant is a dioctyl ester of sodium sulfosuccinic acid.

An example of suitable water dispersible systems includes mixtures of long chain alkyl quarternary surfactants mixed with polyoxyethylene glycol 400 or glycerin. More specifically, a mixture of about 70 percent by weight di(touch hardened tallow) dimethyl ammonium chloride with about 30 percent by weight PEG 400 (which is a pasty wax at about 70 degrees Fahrenheit and a liquid at about 150 degrees Fahrenheit) can be used to form the second material 2000.

In another embodiment, the second material can comprise reaction components that are liquid at room temperature or are water soluble and can be polymerized into a higher molecular weight water soluble solid or high viscosity paste. For example, the second material can comprise a mixture of about 10 percent by weight acrylic acid, about 20 percent by weight sodium acrylate, about 70 percent water, and a free radical initiator. The free radical initiator can be triggered by heat. An example of a flee radical initiator is V-50, a 2,2'-Azobis (2-amidino propane) dihydrochloride available from Wako Chemicals of Dallas Tex.

In another embodiment, the second material can comprise a gelling agent. Suitable gelling agents include, but are not limited to, vegetable gelling agents such as pectin, carrageenan, agar, animal protein gelatins, hydrogel forming polymeric gelling agents, and soap gelling agents. One example of a gelling agent which can be disolved in water to form the second material 2000 is JELLO Brand gelatin from the General Foods Company of White Plains, N.Y.

Suitable hydrogel forming polymeric gelling agents include at least partially cross-linked polymers prepared from polymerizable, unsaturated acid-containing monomers which are water soluble or become water soluble upon hydrolysis. These include monoethylenically unsaturated compounds having at least one hydrophilic radical, including olefincally unsaturated acids and anhydrides which contain at least one carbon-carbon olefinic double bond. U.S. patent application Ser. No. 08/307,951 "Mild Gel Deodorant Composition Containing Soap, Polymeric Hydrogel Forming Polymer and High Level of Water" filed Sep. 16, 1994 in the name of Trandai et al. is incorporated herein by reference in its entirety for the purpose of disclosing gel forming agents.

Suitable soap gelling agents comprise monovalent-metal salts of fatty acids containing from about 12 to about 40 carbon atoms (C12–C40), and more preferably C12–C22 salts of fatty acids. Suitable salt forming cations for use in these gelling agents include metal salts such as alkali metals, eg. sodium and potassium. In one embodiment the second material comprises a salt of fatty acids selected from the group consisting of sodium salts of fatty acids, potassium salts of a fatty acids, and combinations thereof.

Examples of fatty acids useful in synthesizing the soap gel forming agents include myristic, palmitic, stearic, oleic, linoleic, linolenic, margaric, and mixtures of such adds. Sources of such fatty acids include, but are not limited to, coconut oil, beef tallow, lanolin, fish oil, beeswax, palm oil, peanut oil, olive oil, cottonseed oil, soybean oil, corn oil, rapeseed oil, rosin acids, greases, castor oil, linseed oil, oiticica oil, neatsfoot, safflower oil, sesame oil, sorghum oil, sunflower oil, tall oil, tung oil, butter fat, poultry grease, whale oil, and rice bran.

Preferred fatty add soap gel forming agents include sodium laurate, sodium myristate, sodium palmitate, sodium stearate, potassium laurate, potassium myristate, potassium palmitate, and potassium stearate. In one embodiment the second material 2000 comprises a solution of sodium myristate in water. A suitable solution comprises between about 5 and about 30 percent by weight, and more preferably between about 5 and about 20 percent by weight sodium myristate in water. Such a solution can have a gelling temperature of about 90–120 degrees Fahrenheit. The sodium myristate can be formed by reacting myristic acid (C13H27COOH) with NaOH in water. The base and acid are added stoichiometrically to react completely. The NaOH is added to the water and heated to about 180 degrees Fahrenheit. The myristic acid is then gradually added to the water/NaOH solution. The reaction is continued for about an hour. The sodium myristate solution so formed is then cooled to about 140–160 degrees Fahrenheit prior to application to the felt layer 220.

Such a solution of soap gelling agent and water has the advantage that it can be solidified to a gel phase at a temperature between 50 degrees Fahrenheit and about 150 degrees Fahrenheit prior to applying the resin to the substrate. The gel phase can thereby resist displacement of the liquid photosensitive resin at room temperature (about 70 degree Fahrenheit) without requiring refrigeration equipment to provide solidification. In addition, the solution is primarily water (at least about 70 percent water by weight when added to the felt layer 220). Accordingly, removal and disposal of the second material removed from the felt layer 220 is simplified, and environmental concerns are minimized.

Process for Forming a Continous Belt Having a Felt Layer and a Patterned Resin Layer FIG. 5 schematically illustrates a process according to one embodiment of the present invention for forming a web support apparatus 200 in the form of a continuous belt comprising a felt layer 220 having a cured resin layer 250. In the embodiment shown in FIG. 5, the felt layer 220 can comprise an Amflex 2 felt commercially available from Appleton Mills of Appleton, Wis., and the photosensitive resin can comprise an MEH-1000 resin commercially available from Hercules Chemical.

A forming unit 1513 in the form of a drum is provided having a working surface 1512. The forming unit 1513 is rotated by a drive means not illustrated. A backing film 1503 is provided from a roll 1531, and taken up by a roll 1532. Intermediate the rolls 1531 and 1532, the backing film 1503 is applied to the working surface 1512 of the forming unit 1513. The function of the backing film is to protect the working surface of the forming unit 1513 and to facilitate the removal of the partially completed web support apparatus 200 from the forming unit 1513. The backing film 1503 can be made of any suitable material including, but not limited to, a film of polypropylene having a thickness of between about 0.01 and about 0.1 millimeter.

As shown in FIG. 5, the felt dewatering layer 220 in the form of a continuous belt is conveyed about forming drum 1513 and a number of return rolls 1511 in a closed path. Prior to applying the second material and the liquid resin to the felt layer 220, the felt dewatering layer 220 can be conveyed past an infrared heating lamp 2310 to preheat the felt layer 220.

The felt layer 220 is then conveyed in a horizontal direction at a speed of about 1-10 feet/minute adjacent a pipe header 2410 containing the second material. The header 2410 has an opening through which the second material is deposited onto the second surface 232 of the felt layer 220. The opening in the header 2410 is positioned against the the second surface 232 of the felt layer 220. The second material directed from the header 2410 is a solution of about 10 percent by weight sodium myristate in water having a temperature of about 120-150 degrees Fahrenheit.

About 0.9 grams of the second material per square inch of surface area of the felt layer 220 is deposited on the felt layer 220. The felt layer 220 on which the second material is deposited is then carried through a nip 2470 between two rollers 2472. The spacing between the rollers 2472 provides a nip which is about 0.010 inch less than the thickness of the felt layer 220. The nip 2470 ensures distribution of the second material throughout the felt layer 220 and squeezes excess second material from the felt layer 220.

The second material deposited on the felt layer 220 is allowed to cool to a temperature of below about 90 degrees Fahrenheit to solidify the second material. Cooling the second material results in the formation of stable gel phase of the sodium myristate in the voids of the felt layer 220. After a stable gel phase of the second material has been formed, the felt layer 220 is conveyed adjacent to a water shower 2510 at a speed of about 2-4 feet per minute. The water shower has nozzles positioned about 3 inches from the first surface 230 of the felt layer 220 for use in removal of some, but not all, of the gelled second material from the felt layer 220. The nozzles provide a plurality of fan shaped spray patterns arranged in overlapping fashion. The water showers 2510 provide a water spray of about 1.5 gallons per square foot of surface area of the felt layer 220. The nozzles are Spray Systems Tee Jet brand Nozzles, model 50015 having an orifice diameter of about 0.031 inch. The water spray delivered by the showers 2510 has a temperature of about 90 degree Fahrenheit and is delivered to the nozzles at a pressure of about 500 psig.

The water shower 2510 is operated to remove second material adjacent the first surface 230, to thereby provide a portion of the thickness of the felt layer 220 which is substantially free of the second material. The water showers 2510 can be used to remove a layer of the gelled second material having a thickness of between about 0.002 inch and about 0.2 inch. The thickness of the layer of gelled second material removed is less than the thickness of the felt layer 220, such that between about 75 percent and about 98 percent of the thickness of the felt layer 220 remains impregnated with the gelled second material, and most preferably between about 85 percent and about 95 percent of the thickness of the felt layer 220 remains impregnated with the gelled second material after washing with the water showers 2510. A vacuum header 2520 provides a vacuum of about 1-4 psig at the first surface 230 of the felt layer 220 to remove liquified second material and the water spray.

Once the first surface 230 of the felt layer 220 has been prepared by removal of some, but not all of the second material from the felt layer 220, the photosensitive resin can be applied to the first surface 230. The felt dewatering layer 220 is positioned adjacent the backing film 1503 such that backing film 1503 is interposed between the felt dewatering layer 220 and the forming unit 1513, and such that the second felt surface 232 of the felt dewatering layer 220 is positioned adjacent the backing film 1503. A coating of liquid photosensitive resin is applied to the first felt surface 230. The coating of liquid photosensitive resin 1502 can be applied to the first felt surface in any suitable manner. In FIG. 5 the coating of resin is applied by a nozzle 1520 to form a pool of resin on the the felt layer 220 upstream of a nip formed by nip roll 3100.

The thickness of the coating of resin applied to the felt layer 220 is controlled to a preselected value corresponding to the desired difference in elevation 262 between the elevation of the first felt surface 230 and the elevation of the web contacting top surface 260 of the web patterning layer 250. In FIG. 5, the thickness of the coating of resin is controlled by mechanically controlling the clearance between a nip roll 3100 and the forming unit 1513. The nip roll 3100 in conjunction with the mask 3010 and a mask guide roll 1542 tend to smooth the surface of the resin and control its thickness. The gelled second material prevents the liquid photosensitive resin from penetrating throughout the portion of the thickness of felt layer 220 occupied by the gelled second material.

The mask 3010 can be formed of any suitable material which can be provided with opaque and transparent portions. The transparent portions are arranged in a pattern corresponding to the desired pattern of the web patterning layer 250. A material in the nature of a flexible photographic film is suitable. The opaque portions can be applied to the mask 3010 in any suitable way, such as photographic, gravure, flexographic, or rotary screen printing. The mask 3010 can be an endless belt, or alternatively, supplied from one supply roll 3012 and taken up by a take-up roll 3016, as shown in FIG. 5. As shown in FIG. 5, the mask 3010 is conveyed around the rolls 3100, 1542, 3014, and 3016. Intermediate the rolls 3100 and 1542, the mask 3010 travels with the felt layer 220 around the forming unit 1513, and is positioned adjacent the liquid resin, with the mask intermediate the resin and a source of actinic radiation which is suitable for curing the liquid resin.

The photosensitive resin is exposed to actinic radiation of an activating wavelength through the mask 3010, thereby inducing at least partial curing of the resin in those portions of the layer of resin which are in register with transparent portions of the mask 3010. In FIG. 5, ultraviolet radiation having an activating wavelength is supplied by first curing lamps 3150. The activating wavelength is a characteristic of the resin, and can be supplied by any suitable source of illumination such as mercury are, pulsed xenon, electrodless, and fluorescent lamps. For the MEH-1000 resin, suitable curing lamps 3150 are F450 Fusion Lamps fitted with "D" or "H" bulbs, and commercially available from Fusion Systems, Inc. of Rockville, Md. The felt layer 220 can be conveyed adjacent the curing lamps 3150 at a speed of about 1-3 feet/minute during casting.

Partial curing of the resin is manifested by a solidification of the resin registered with the transparent portions of the mask 3010, while the unexposed potions of the resin registered with the opaque potions of the mask 3010 remain liquid. To obtain a uniform initial curing of the resin on the felt layer 220, the energy provided by the UV light to the photosensitive resin should be uniform across the width of the felt layer 220. Output from each of the curing lamps 3150 should be matched to be within at least about 5 percent of each other. The curing lamps 3150 can be positioned side by side in the cross-machine direction (perpendicular to the plane of FIG. 5.) For example, three curing lamps 3150 can be positioned side by side in the machine direction. A pair of aperture plates are disposed intermediate the lamps 3150 and the felt layer 220, and are spaced apart in the machine direction to form an aperture gap through which ultraviolet light is directed from the lamps 3150 to the resin pooled on the felt layer 220.

Total energy directed to the felt layer 220 can be measured by a "light bug" such as the EIT UV Integrating Radiometer, Model Number UR365CH1 made by Electronic Instrumentation Technologies located in Stifling Va. The light bug can be fastened to the casting drum 1513 to measure the integrated energy in millijoules per square centimeter applied to the felt layer 220. By repeating this measurement every ½ inch across the width of the drum 1513, a profile of the energy imparted from the lamps 3150 to the photosensitive resin can be determined. If the gap between the aperture plates is uniform along the width of the drum 1513, the energy profile will generally not be uniform. The gap between the aperture plates can be varied as a function of position in the cross-machine direction to provide a uniform energy profile delivered by the lamps 3150 to the resin pooled on the felt layer 220.

After partially curing the resin layer applied to the first surface 230, substantially all the uncured liquid resin can be removed from the felt dewatering layer 220. The uncured liquid resin can be removed from the felt layer 220 by high pressure showering of the felt layer 220 with water, or alternatively, a mixture of surfactant and water. At a point adjacent the roll 1542 the mask 3010 and the backing film 1503 are separated from the felt layer 220 and the partially cured resin layer. The composite felt layer 220 and partially cured resin layer are conveyed adjacent water showers 2530. The water showers 2530 can be angled to remove uncured resin 2010A from the openings in the patterned resin layer.

The showers 2530 deliver a spray at a temperature of about 60–80 degrees Fahrenheit through nozzles such as Spray Systems Tee Jet brand Nozzles, model 50015, having an orifice diameter of about 0.031 inch. The shower delivery pressure is about 500 psig. The showers 2530 and the felt layer 220 can be moved laterally (perpendicular to the plane of FIG. 5) relative to one another to eliminate streaking and provide uniform removal of the liquid resin across the width of the felt layer 220.

The composite felt layer 220 and resin layer can then be carried through a bath 1620 of distilled or deionized water. At this point, the gelled second material is still present in the second felt layer 220. Post cure lamps 3180 positioned over the bath 1620 are turned off while the composite felt layer 220 and resin layer is carried through the bath 1620 for the first time. The post cure lamps are turned on in a final curing step described below.

After leaving the bath 1620, the composite felt layer 220 and resin layer is carried intermediate infrared heating lamps 3170 and a vacuum header 2560 at a speed of about 1–3 foot per minute. The heating lamps 3170 heat the gelled second material to a temperature of about 140 degrees Fahrenheit, which is above the gelling temperature of the second material, so that substantially all of the second material is liquified for removal from the felt layer 220. The heating lamps 3170 are positioned adjacent the first felt surface 230, and the vacuum header 2560 is positioned adjacent the second felt surface 232. The heating lamps 3170 can be positioned about 3 inches from the felt layer 220. A suitable infrared heating lamp 3170 is a Protherm heating lamp manufactured by the Process Thermal Company, and having a power rating of about 20 amps. The vacuum header 2560 provides a vacuum of about 1–5 psig at the second felt surface 232.

The composite felt layer and resin layer is then conveyed intermediate hot water showers 2550 and a vacuum header 2570. The hot water shower 2550 directs a spray against the first surface 230 of the felt layer 220. The showers 2550 deliver the a distilled water spray at a temperature of about 140 degrees Fahrenheit using Tee Jet brand Nozzles. The shower delivery pressure is about 50–200 psig. The vacuum header 2570 provides a vacuum of about 1–5 psig at the second surface 232 of the felt layer 220 to remove liquified second material and any remaining uncured liquid resin from the second surface 232.

Preferably substantially all of the second material is removed from the felt layer 220 by the heat lamps 3170, water showers 2550, and vacuum headers 2560 and 2570. If desired, the composite felt layer 220 and resin layer can be conveyed around the closed path defined by roller 1513 and rollers 1511 for multiple passes through the heat lamps 3170, water showers 2550, and vacuum headers 2560 and 2570. It will be understood that if the composite felt layer 220 and resin layer is carried around the closed path multiple times to remove the second material from the felt layer 220, the multiple passes are made without adding more second material or or liquid resin to the felt layer 220, and with the ultraviolet lamps 3150 and 3180 turned off The web support apparatus 200 can be inspected with a microscope to verify that all the uncured liquid resin and second material have been removed from the felt layer 220. Alternatively, the cleanliness of the felt layer 220 can be measured using a drainage test as follows. The web support apparatus 200 can be positioned between between upper and lower Plexiglas orifice plates having 3.25 inch openings. The upper orifice plate is joined to an upstanding cylinder having an internal diameter of about 4 inches. Distilled water is added to the cylinder to maintain a column of water about 4 inches high in the cylinder. The volume of water passing through the apparatus 200 is measured for a drainage time of 1 minute. The drainage rate (cubic centimeters/sec/square foot) of the web support apparatus 200 should be generally uniform when measured at different locations on the web support apparatus 200, and should be at least about equal to the drainage rate of the felt layer 220 multiplied by the fraction of the projected area of the apparatus 200 not covered by the web patterning layer 250.

A final step in practicing the present invention can include a second post curing step for completing curing of the resin layer on the first surface of the felt layer 220. Once substantially all the second material and all the uncured liquid resin have been removed from the felt layer 220, the composite felt layer 220 and resin can be conveyed through the bath 1620. Post curing lamps 3180 positioned above the bath 1620 provide final curing of the resin layer. The composite felt layer 220 and resin layer are submerged in the bath 1620 which preferably contains water and a reducing agent, such as sodium sulfite, to remove dissolved oxygen in the water which would otherwise quench the free radical curing reaction in the bath 1620.

The composite felt layer 220 and resin layer 250 are carried through the bath 1620 at a speed of about 1-3 feet per minute with the post curing lamps 3180 turned on. Suitable post curing lamps 3180 are the F450 lamps listed above. The water in the bath 1620 permits passage of the actinic radiation from the post curing lamp 3180 to the resin layer 1521, while precluding oxygen which can quench the free radical polymerization reaction. The water depth in the bath 1620 can be about 1-4 inches. After exiting the bath 1620, the composite felt layer 220 and resin layer 250 (FIG. 4H) can be carried over a vacuum header to remove water from the felt layer 220.

The post curing sequence of passing the composite felt layer 220 and resin layer through the bath 1620 with the post curing lamp 3180 turned on can be repeated about 1 to 3 times until the resin layer 250 is no longer tacky. At this point, the felt layer 220 and the cured resin, together, form the web support apparatus 200 having a fully cured web patterning layer 250. The post curing sequence can be repeated by carrying the composite felt layer 220 and resin layer around the circuit provided by the rollers 1513 and 1511 one to three times with the lamp 3150 turned off.

In one embodiment, the mask 3010 can be provided with a transparent portion in the form a continuous network. Such a mask can be used to provide the web support apparatus 200 having a web patterning layer 250 having a continuous network web contacting top surface 260 having a plurality of discrete openings 270 therein, as shown in FIG. 1. Each discrete opening 270 communicates with the first felt surface 230 through a conduit formed in the web patterning layer 250. Suitable shapes for the openings 270 include, but are not limited to circles, ovals elongated in the machine direction (MD shown in FIG. 5), polygons, irregular shapes, or mixtures of these. The projected surface area of the continuous network top surface 260 can be between about 5 and about 75 percent of the projected area of the web support apparatus 200 as viewed in FIG. 1, and is preferably between about 20 percent and about 60 percent of the projected area of the web support apparatus 200 as viewed in FIG. 1.

In the embodiment shown in FIG. 1, the continuous network top surface 260 can have less than about 700 discrete openings 270 per square inch of the projected area of the web support apparatus 200, and preferably between about 70 and about 700 discrete openings 270 therein per square inch of projected area of the web support apparatus as viewed in FIG. 1. Each discrete opening 270 in the continuous network top surface can have an effective free span which is between about 0.5 and about 3.5 millimeter, where the effective free span is defined as the area of the opening 270 divided by one-fourth of the perimeter of the opening 270. The effective free span can be between about 0.6 and about 6.6 times the elevation difference 262. An apparatus having such a pattern of openings 270 can be used as a drying belt or press fabric on a papermaking machine for making a patterned paper structure having a continuous network region which can be a compacted, relatively high density region corresponding to the web contacting surface 260, and a plurality of generally uncompacted domes dispersed domes dispersed throughout the continuous network region, the domes corresponding to the positioning of the openings 270 in the surface 260. The discrete openings 270 are preferably bilaterally staggered in the machine direction (MD) and cross-machine direction (CD) as described in U.S. Pat. No. 4,637,859 issued Jan. 20, 1987, which patent is incorporated herein by reference. In the embodiment shown in FIG. 1, openings 270 are over-lapping and bilaterally staggered, with the openings sized and spaced such that in both the machine and cross-machine directions the edges of the openings 270 extend past one another, and such that any line drawn parallel to either the machine or cross-machine direction will pass through at least some openings 270.

Measurement of Web Support Apparatus Elevations

The elevation difference 262 between the elevation 231 (FIG. 2) of the first felt surface 230 and the elevation 261 of the web contacting surface 260 is measured using the following procedure. The web support apparatus is supported on a flat horizontal surface with the web patterning layer facing upward. A stylus having a circular contact surface of about 1.3 square millimeters and a vertical length of about 3 millimeters is mounted on a Federal Products dimensioning gauge (model 432B-81 amplifier modified for use with an EMD-4320 W1 breakaway probe) manufactured by the Federal Products Company of Providence, R.I. The instrument is calibrated by determining the voltage difference between two precision shims of known thickness which provide a known elevation difference. The instrument is zeroed at an elevation slightly lower than the first felt surface 230 to insure unrestricted travel of the stylus. The stylus is placed over the elevation of interest and lowered to make the measurement. The stylus exerts a pressure of 0.24 grams/square millimeter at the point of measurement. At least three measurements are made at each elevation. The difference in the average measurements of the individual elevations 231 and 261 is taken as the elevation difference 262.

FIGS. 6 and 7 are photomicrographs of a web support apparatus 200 made according to the present invention. The web support apparatus 200 in FIGS. 6 and 7 comprises a resin layer 250 cured on a dewatering felt layer 220. The cured resin layer 250 penetrates a surface 230 of the felt layer 220, such that the cured resin layer extends into a portion of the thickness of the felt layer adjacent to the surface 230. The cured resin layer 250 also extends from the 230, such that the surface 260 of the resin layer is spaced from the surface 230.

In the embodiments described above, the substrate comprises a dewatering felt layer 220. However, the method of the present invention can also be used to form patterned resin layers on other substrates. For example, the substrate can comprise a papermaking forming or drying fabric comprising woven filaments, which fabric can have an air permeability of between about 300 and about 1,500 scfm. A non-limiting example of an alternative substrate is a papermachine fabric described in the following U.S. Patents issued to Trokhan and incorporated herein by reference: U.S. Pat. No. 4,191,609 issued Mar. 4, 1980 and U.S. Pat. No. 4,239,065 issued Dec. 16, 1980.

What is claimed:

1. A method of applying a photosensitive resin to a substrate to form an apparatus for use in papermaking, the method comprising the steps of:

providing a substrate having a first surface, a second surface, and a thickness, the substrate having voids intermediate the first and second surfaces;

providing a liquid photosensitive resin;

providing a second material different from the liquid photosensitive resin;

providing a source of actinic radiation;

applying the second material to the substrate to occupy at least some of the voids in the substrate intermediate the first and second surfaces of the substrate;

removing at least some, but not all, of the second material from the substrate before applying the liquid photosensitive resin to the substrate;

applying the liquid photosensitive resin to the substrate to occupy at least some of the voids in the substrate;

exposing at least some of the liquid photosensitive resin to the actinic radiation; and curing at least some of the photosensitive resin to provide a patterned resin layer disposed on the first surface of the substrate.

2. The method of claim 1 further comprising the step of substantially changing the viscosity of at least some of the second material applied to the substrate before the step of curing the resin.

3. The method of claim 1 further comprising the step of removing at least some of the second material from the substrate after applying the resin to the substrate.

4. The method of claim 1 further comprising the step of changing the phase of at least some of the second material applied to the substrate before the step of curing the resin.

5. The method of claim 1 further comprising the step of solidifying at least some of the second material applied to the substrate at a temperature between about 50 degrees Fahrenheit and about 150 degrees Fahrenheit prior to applying the resin to the substrate.

6. The method of claim 1 further comprising the step of cooling at least some of the second material applied to the substrate before the step of curing the resin, and the step of heating at least some of the second material applied to the substrate before a step of removing second material from the substrate.

7. The method of claim 1 wherein the second material comprises water.

8. The method of claim 1 wherein the second material comprises a component which is soluble in water.

9. The method of claim 1 wherein the second material comprises a solvent and a solute.

10. The method of claim 1 wherein the second material comprises a surfactant.

11. The method of claim 1 wherein the second material comprises an alcohol.

12. The method of claim 1 wherein the second material comprises a component selected from the group consisting of glycerol, polyoxyethylene glycol, polyoxypropylene glycol, and combinations thereof.

13. The method of claim 1 wherein the second material comprises a gelling agent.

14. The method of claim 13 wherein the second material comprises a soap gelling agent.

15. The method of claim 1 wherein the second material comprises a salt of fatty acids containing from about 12 to about 22 carbon atoms.

16. The method of claim 1 wherein the second material comprises a salt of fatty acids selected from the group consisting of sodium salts of fatty acids, potasium salts of a fatty acids, and combinations thereof.

17. The method of claim 1 wherein the second material comprises a gel forming agent selected from the group consisting of sodium laurate, sodium myristate, sodium palmitate, sodium stearate, potassium laurate, potassium myristate, potassium palmitate, potassium stearate, and mixtures thereof.

18. A method of applying a photosensitive resin to a substrate to form an apparatus for use in papermaking, the method comprising the steps of:

providing a substrate having a first surface, a second surface, and a thickness, the substrate having voids intermediate the first and second surfaces;

providing a liquid photosensitive resin;

providing a second material different from the liquid photosensitive resin;

providing a source of actinic radiation;

providing a mask comprising regions opaque to the radiation and regions transparent to the radiation;

applying the second material to the substrate to occupy at least some of the voids in the substrate intermediate the first and second surfaces of the substrate;

providing a portion of the thickness of the substrate adjacent the first surface of the substrate which is substantially free of the second material;

applying the liquid photosensitive resin to the first surface of the substrate to occupy at least some of the voids in the portion of the thickness of the substrate which is substantially free of the second material;

positioning the mask intermediate the source of radiation and the coating of liquid photosensitive resin; and exposing liquid photosensitive resin to the actinic radiation through the mask to induce curing of photosensitive resin in registration with the transparent regions in the mask to provide a patterned resin layer disposed on the first surface of the substrate.

19. The method of claim 18 wherein the substrate comprises a papermaker's dewatering felt.

20. A method of applying a photosensitive resin to a substrate to form an apparatus for use in papermaking, the method comprising the steps of:

providing a substrate having a first surface, a second surface, and a thickness, the substrate having voids intermediate the first and second surfaces;

providing a liquid photosensitive resin;

providing a second material different from the liquid photosensitive resin;

providing a source of actinic radiation;

providing a mask comprising regions opaque to the radiation and regions transparent to the radiation;

applying the second material to the substrate to occupy at least some of the voids in the substrate intermediate the first and second surfaces of the substrate;

removing some, but not all, of the second material from the substrate prior to applying the liquid photosensitive resin to the substrate, to provide a portion of the thickness of the substrate adjacent the first surface of the substrate which is substantially free of the second material;

applying the liquid photosensitive resin to the first surface of the substrate;

positioning the mask intermediate the source of radiation and the coating of liquid photosensitive resin;

exposing the liquid photosensitive resin to the actinic radiation through the mask to induce curing of the photosensitive resin in registration with the transparent regions in the mask to provide a patterned resin layer on the first surface of the substrate;

removing at least some uncured photosensitive resin and second material from the substrate after curing photosensitive resin in registration with the transparent regions in the mask; and post curing the photosensitive resin after removing substantially all of the second material from the substrate.

21. A method of applying a photosensitive resin to a papermakers dewatering felt, the method comprising the steps of:

providing a papermakers dewatering felt having a first surface, a second surface, and a thickness, the papermakers dewatering felt having voids intermediate the first and second surfaces;

providing a liquid photosensitive resin;

providing a second material different from the liquid photosensitive resin;

providing a source of actinic radiation;

applying the second material to the papermakers dewatering felt to occupy at least some of the voids in the papermakers dewatering felt intermediate the first and second surfaces of the papermakers dewatering felt;

applying the liquid photosensitive resin to the papermakers dewatering felt;

exposing at least some of the liquid photosensitive resin to the actinic radiation; and curing at least some of the photosensitive resin to provide a patterned resin layer disposed on the first surface of the papermakers dewatering felt.

22. The method of claim 21 further comprising the step of providing a portion of the thickness of the felt adjacent the first surface of the felt which is substantially free of the second material before applying the resin to the felt.

23. The method of claim 22 wherein the step of providing a portion of the thickness of the felt adjacent the first surface which is substantially free of the second material comprises removing some, but not all, of the second material from the felt before applying the resin to the felt.

24. The method of claim 21 further comprising the steps of:

solidifying at least some of the second material applied to the felt before applying resin to the felt; and removing some, but not all, of the second material from the felt before applying resin to the felt.

25. The method of claim 21 wherein the papermakers dewatering felt comprises a fibrous batt, wherein the step of applying the second material to the dewatering felt comprises applying the second material to the fibrous batt to occupy at least some voids in the fibrous batt, and wherein the step of applying the photosensitive resin to the dewatering felt comprises applying the resin to the fibrous batt.

* * * * *

UNITED STATES PATENT AND TRADEMARK OFFICE
CERTIFICATE OF CORRECTION

PATENT NO. : 5,674,663

DATED : October 7, 1997

INVENTOR(S) : JAMES ROBERT McFARLAND ET AL.

It is certified that error appears in the above-identified patent and that said Letters Patent is hereby corrected as shown below:

Column 7, line 20, "at." should read -- al. --.

Column 7, line 34, "at." should read -- al. --.

Column 13, line 41, "flee" should read -- free --.

Column 14, line 10, "adds." should read -- acids.

Column 14, line 18, "add" should read -- acid --.

Column 17, line 1, "potions" should read -- portions --.

Column 17, line 2, "potions" should read -- portions --.

Column 17, line 20, "Stifling" should read -- Stirling --.

Column 18, line 35, "off" should read -- off. --.

Signed and Sealed this

Twenty-seventh Day of October, 1998

Attest:

BRUCE LEHMAN

*Attesting Officer*    Commissioner of Patents and Trademarks